P. P-G. HALL.
METAL WORKING MACHINE.
APPLICATION FILED DEC. 5, 1918.

1,343,503.

Patented June 15, 1920.
3 SHEETS—SHEET 1.

Fig. 1.

WITNESS
F. J. Hartman.

INVENTOR
Peter P-G. Hall,
Blount & Moulton
BY
ATTORNEYS

UNITED STATES PATENT OFFICE.

PETER P-G. HALL, OF PHILADELPHIA, PENNSYLVANIA.

METAL-WORKING MACHINE.

1,343,503.  Specification of Letters Patent.  Patented June 15, 1920.

Application filed December 5, 1918. Serial No. 265,331.

*To all whom it may concern:*

Be it known that I, PETER P-G. HALL, a citizen of the United States, and a resident of Philadelphia, county of Philadelphia, State of Pennsylvania, have invented a certain new and useful Metal-Working Machine, of which the following is a specification.

This invention relates to a novel metal working machine capable in one of its uses to operate as a straight or tapered thread milling mechanism but more particularly for milling tapered threads and adapted to cut all the threads in a piece of work during a single relative circuit between the cutting tool and the work to make a continuous screw therein, the mechanism being so constructed as to adapt the device not only to the use of forming external or internal threads on a piece of work, in which there is relative movement between the work and the tool, but also to adapt the device for milling generally, such as performing drilling, boring and other machine tool operations. The object of the invention, therefore, in its broader concept, is to provide a novel association of means capable of a wide range of uses, as indicated, in which a mechanism is arranged so that there may be a relative helical movement between a rotating cutter and the work operated upon to facilitate, in one instance, and preferably, the cutting of tapered threads by making a plurality of threads simultaneously, or in another case the milling or boring of a surface, such as that of a truncated cone, relatively rapidly.

More particularly, it is the object of this invention to provide such a mechanism capable of such variety of uses, in which the device may be readily arranged as desired, to obtain preferably tapered threads of various pitches, and to obtain also tapered threads of various depths, and my invention has for its further object to provide mechanism of this character which may be partially controlled by hand, bringing the work to initial cutting position relative to the cutter, performing the operation thereon, releasing and then returning the operative elements of the mechanism to initial starting position, at which, the piece of work operated upon may be replaced by a new piece.

It is to be understood that my invention is not limited to the particular form of means shown and described herein, or the use and arrangement of the parts suggested herein, but that the same is capable of a wide range of use, material rearrangements of parts and radically different associations of means, which will be readily apparent to those skilled in the art with the disclosure made herein before them, without departing from the spirit of my invention and the general scope of the appended claims, and that the particular embodiments shown in the drawings and described in the specification are merely given as exemplifications of means for reducing my invention to practice for the purpose of illustration merely and not with the object or intent of limiting my invention to the particular embodiments disclosed.

Referring more particularly to the drawing.

In the embodiment of the invention selected for illustration herewith is shown a hand controlled thread milling mechanism adapted in this case to operate with a rotating piece of work for milling either internal or external threads therein. Means are provided to move the device with the piece of work transversely of the machine bed toward the rapidly rotating cutting tool and to the thread depth or initial cutting position for any desired diameter and to give the piece of work a comparatively slow angular or rotary movement about its axis combined with a simultaneous longitudinal movement along a line disposed at an angle with the axis of the work or work operating elements, thereby giving the surface of the work a resultant movement in an inclined helical path relative to the machine base, or, stated in terms of relation between the cutter and work, in a conically helical path, while the tool is rotated about a fixed axis, both during and after the initial period of time when the work has been moved into operative engagement with the tool to the extent of the predetermined depth of the thread. By providing the tool with a plurality of cutters, a single rotary circuit of the piece of work as the tool rapidly rotates, will cause a plurality of threads to be cut simultaneously in the work, or if a single cutter be used, the work may be given a plurality of circuit movements to obtain the same result. At the end of the cycle of operations, means may be provided to stop the operation of the work mechanism, release the work and its driving mechanism from the cutting tool, return the same to the original non-operative position, release the finished piece of work for replacement by a new piece to be operated upon, and these movements preferably may be performed manually.

Referring to the drawing, the form of invention shown therein comprises a substantially barrel-shaped housing 1 provided with an integral pedestal 7 adapted to be adjustably bolted or otherwise secured, as appears more particularly hereinafter, to a movable table 3, so that it may be moved with the table when desired. This table 3 is constructed to longitudinally slide upon a slide-way plate 4, the latter being provided with a dove-tail slide track or keyway 4' over which the table 3 slidably fits for longitudinal relative adjustment thereof. The slide-way plate 4 has provisions of any suitable type for transverse movement over the bed plate 5, the latter being provided with a groove 6 adapted to slidably guide the slide-way plate 4 over said bed-plate 5 accordingly, said slide-way plate 4 being provided with a depending guide key 4'' slidably fitted and guided in said groove 6. Any appropriate means, preferably manually operated, may be used to traverse said slide-way plate 4 over the bed-plate 5, such parts being very common in machines of this character, such as lathes and milling machines, requiring sliding movements of parts along and across the machine, and no claim is made by me as to the novelty of these parts *per se*.

The casing, through its pedestal, rests upon the table 3 and is capable of movement relative thereto horizontally over said table. Provision is also made through certain parts connected to said casing to otherwise secure and support the casing by a universal joint means, more particularly described hereinafter, whereby the movement relative to the table, as aforesaid, is a horizontal angular movement about a vertical axis passing through the center of said universal joint means. The amplitude of said angular movement may be of any amount desired for the purposes herein disclosed. For the purpose of securing the casing in any of its predetermined angularly adjusted positions, the pedestal 7 may be provided on both sides with arc-shaped and arcuately slotted ears 8, 8. Set screws threadedly engaging the table 3 may pass through the slots 9 of said ears whereby the housing and attached parts may be securely held in any predetermined adjusted angular position relative to the table 3, the set screws serving to bind the ears 8, 8 to the table 3 with sufficient pressure to maintain the parts in said adjusted position. Thus, it can be readily perceived that the housing with its attached parts may be swung from a position wherein its axis coincides with the main axis A—A of the machine in general, about a vertical axis passing through the center of universal joint means to a position as shown, for example, in Fig. 1, the axis B—B of the housing, etc. being disposed at an acute angle with the main axis A—A.

The housing at the rear end carries a suitable gear casing 2 which is secured to the housing 1 by means of a plurality of suitably disposed machine screws 3'' passing through a peripheral flange with which the gear casing is provided and which abuts against the rear face of the housing.

Figure 1:
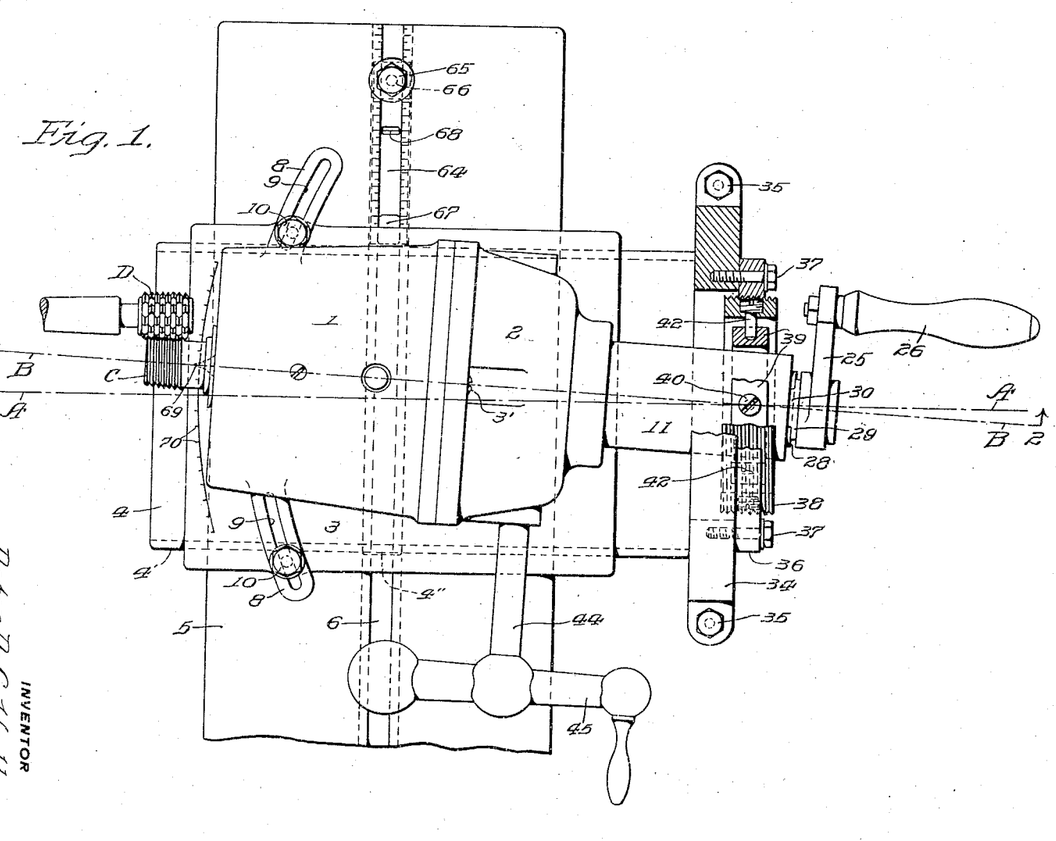
Figure 1 is a top plan view with certain parts in section.
Figures 2, 4:
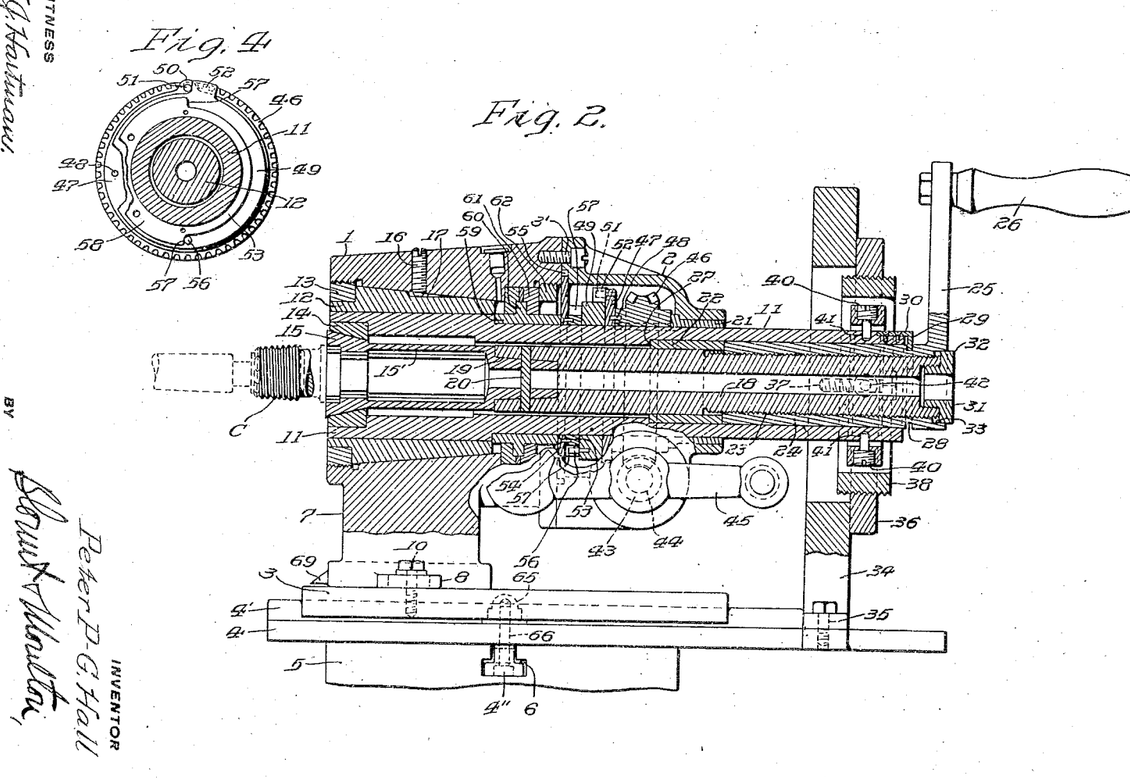
Fig. 2 is a longitudinal vertical sectional view taken substantially on line 2—2 of Fig. 1.
Fig. 4 is a transverse sectional view of certain elements.
Figures 3, 5:
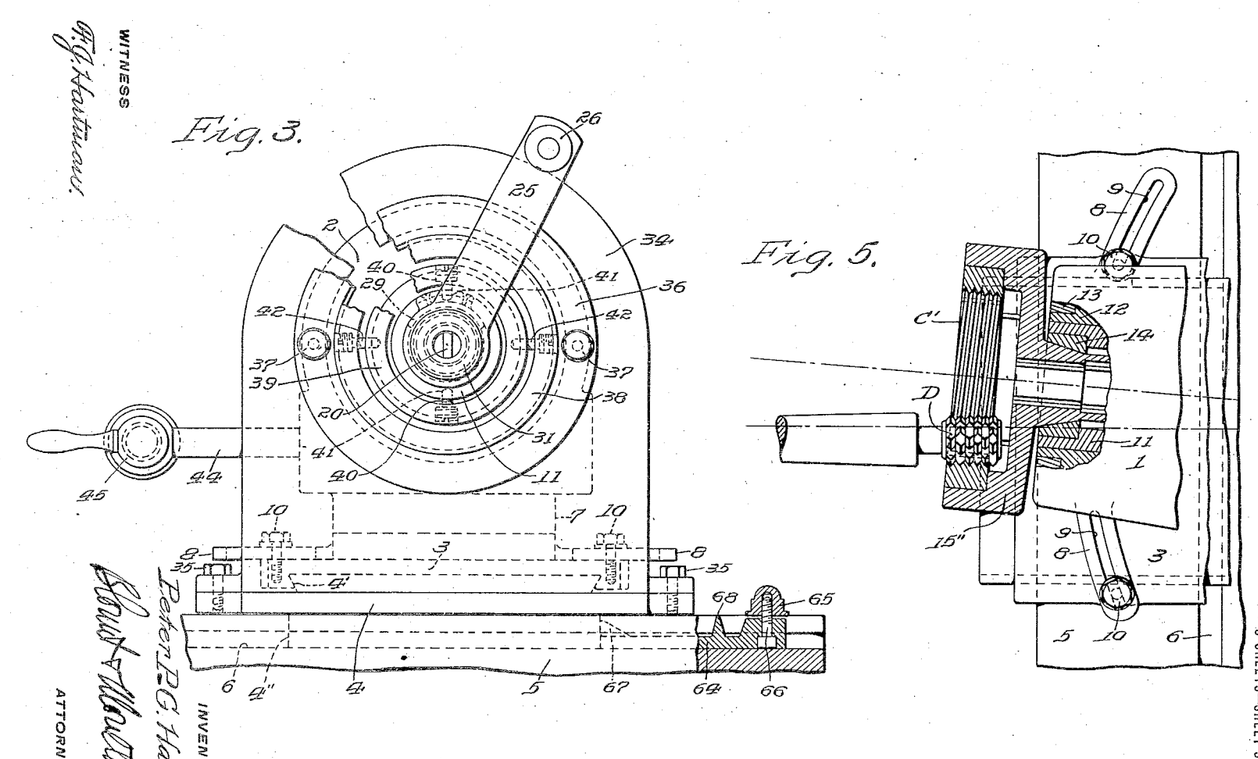
Fig. 3 is a rear end view of the device.
Fig. 5 is a fragmentary top plan view showing the mode of cutting internal threads.

For holding the work C or C', which is typically indicated in full lines in Figs. 1, 2 and 5, and which of course may be of varying forms, a suitable expanding chuck or split jaw collet 15 or 15'' extends centrally through the housing and is arranged at its forward end, that is the end adjacent the work, with a tapered formation for engagement with an internally tapered collet bushing 14 supported in and surrounded by the recessed forward end of the tubular shaft 11, hereinafter more particularly described. It is, therefore, obvious that any inwardly directed endwise movement given the collet will cause the split jaws of the collet to bend inwardly and clamp the work that has been inserted at the collet socket. This function is made possible by virtue of the surfaces between the collet and collet bushing being tapered, as shown. The tubular shaft 11 is supported at the forward end in a split tapered bearing member 12 positioned within the housing and maintained therein by means of an annular spanner thrust nut 13 threaded into a suitable aperture at the forward end of the housing, the tapered bearing member being prevented from axial rotation by means of a set screw 16 extending through the wall of the housing and into a slot 17 provided in the exterior surface of the bearing member, the slot being formed to permit longitudinal movement of the bearing member by the means of the thrust nut 13 when desired to accomplish its diametrical adjustment. The mandrel or collet means in general is composed of the expanding or split jaw portion 15' and a rigid tubular portion 18 and both of these parts are rigidly secured together by a tapered joint means 19 and a cross pin 20, as clearly shown in Fig. 2. At the rear end of the gear casing 2 is inserted a cylindrical bearing member 21 which serves as a bearing for the rear portion of the tubular shaft 11 and at the same time there is interposed between this tubular shaft 11 and the rigid tubular portion 18 of the mandrel, a cylindrical sleeve member 22 acting in the capacity as a bearing element for both the tubular shaft 11 and the tubular portion 18 of the mandrel. The rear end of the portion 18 of the mandrel is externally threaded as at 23 for the reception of an internally threaded hub 24 of the crank 25, having a convenient handle 26, and the forward end of the hub is arranged to engage against the rear end of the cylindrical sleeve member 22, which in turn bears at the other end against an annular shoulder 27 formed in the tubular shaft 11, so that the rotation of the crank in a clockwise direction will serve to draw the collet into the tapered bushing 14 to clamp the work C or C' in the collet jaws, any reactive thrust tending to move the hub 24 toward the forward end of the machine being prevented by the hub abutting against the end of the cylindrical sleeve member 22, which in turn abuts against the shoulder 27, it being understood, of course, that said jaws are suitably designed for gripping the particular form of work upon which it is desired to mill the thread. As exemplifying this, in Figs. 1 and 2 is shown a piece of work being threaded with an external thread, the form of collet used being such as to properly clamp and hold the particular form of work shown, while on the other hand, when it is desired to cut an internal thread, as in a ring or the like, the form of collet adapted for holding that type of work is shown in Fig. 5, the collet jaws being extended radially to a sufficient extent to appropriately clamp and hold this particular type of work. Accordingly, the design of the work holding means may be varied to suit the same.

For preventing the hub 24 from becoming accidentally unscrewed from the mandrel part 18 upon reverse turning of the crank, at the time when it is desired to loosen the collet jaws from the work, the hub may be provided with an annular groove 28 within which is disposed an arc-shaped flange 29, which flange is an integral part of the attachment piece 30 rigidly secured to the tubular shaft 11 at its rear end by means of any suitable securing elements, such as screws. By this means, the flange 29 projecting into the groove 28, acts as an abutment member for the crank and hub means, preventing the same from working backward over the portion 18 to an idle effect, and consequently insures the movement of the mandrel or collet forwardly to loosen the same from the bushing 14 and thereby release the work. The rear end of the tubular portion of the mandrel is internally threaded for the reception of a plug 31, the head 32 of which is larger in diameter than that of the member 18. This head fits into a socket 33 provided in the end of the hub 24 and the space provided between the head 32 and the bottom of the socket 33 is sufficient to permit the relative longitudinal movement between the hub 24 and the mandrel portion 18 that is necessary to appropriately loosen the collet jaws from the bushing 14 and the work C or C', before the hub and head 32 abut. The abutting of the last two mentioned members indicates the limit of the movement and acts also as a stop therefor. Any suitable means may be used to screw the plug 31 into place.

For the purpose of governing the longitudinal movement of the collet or mandrel and of imparting to it a progression equal to the pitch of the thread which is desired to be cut or produced upon the work, a master thread and nut arrangement in connection with a universal joint device may be provided. The form shown here is mounted upon a standard 34 which is fixed at its base to the slide-way plate 4 by means of any suitable attaching elements, such as screws 35. The master nut 36 is secured to the standard by any appropriate means, such as bolts 37 or the like, and the master screw 38 is threaded therein so that the two members are in concentric relation. From this point the universal joint feature is constructed to connect the master screw with the tubular shaft 11. Any suitable form of universal joint means may be utilized and in the form shown as illustrating an embodiment thereof, is provided an internal ring into which are threaded at suitable and diametrically opposed points, radially directed pivot pins 40, 40, the ends of, which are smooth and reduced in diameter and project inwardly into sockets 41 in the tubular shaft 11. In the embodiment shown, these pins are disposed along a vertical axis intersecting the axis of the tubular shaft 11, so that the shaft 11 may be adapted for pivotal movement relative to said ring 39 about the axis of the pins, or, in other words, the shaft 11 with its attachments, is adapted to swing horizontally over the table 3 about the pins 40 as pivots. Another pair of pivot pins 42, 42 are threaded into the master screw 38, as best shown in Fig. 1, and the ends of said pins are also smooth and reduced in diameter to fit in sockets in the internal ring 39. These pins, it will be noticed, are diametrically opposed and are also disposed along an axis at right angles to that of pins 40, 40. This arrangement permits movement of the parts, connected to the universal joint means, in a vertical direction when desired. Any rotating of the tubular shaft 11 transmits a like movement to the universal joint elements, that is to say, the ring 40 and the master screw 38. The turning of the latter in the master nut 36, which is fixed to the standard 34, and consequently the slide-way plate 4 as a base, imparts a longitudinal movement to the shaft 11 as well as all of the attached parts, including the casing and table 3, relative to the slide-way 4. This movement of the organization is along a line parallel to the main axis A—A, and not along the line B—B. The master nut and screw, therefore, perform a function similar to a lead screw in a lathe.

For the purpose of imparting to the work and the collet or mandrel a relatively slow and steady movement of rotation, means are provided comprising a worm 43, which may preferably be formed with a triple thread of relatively great pitch, and positioned on, or integral with, a worm shaft 44 at the end of which is provided a ball crank handle 45 by means of which the worm may be readily rotated. The worm 43 meshes with a worm gear 46, which in turn is secured by a suitable key or other securing means to the tubular shaft 11 whereby the worm gear and the tubular shaft may rotate together. The worm gear 46 is prevented from longitudinal movement relative to the tubular shaft 11 by reason of its abutting against the cylindrical bearing member 21 on the one side and certain other operating elements upon the other side, to be described hereinafter.

Adjacent to the worm gear 46 is located an annular tappet disk 47 which is secured to the worm gear 46 by means of pins 48 or any similar securing means, and adapted to rotate therewith at all times. Adjacent to this disk is located an annular latch disk 49 which is adapted to rotate on the tubular shaft 11. The tappet disk 47 is provided with a radially extending projection or ear 50 to which is fixed a laterally extending tappet stud 51 which over-rides the periphery of the latch disk 49. The latch disk 49 is also provided with a radial extension 52. As the tappet disk 47 is caused to rotate relative to the latch disk 49, the stud 51 will ride therearound until it engages the extension 52 and carry the latch disk 49 therewith in its further rotation. Adjacent to the latch disk 49 is located an annular stop disk 53, which disk is anchored to an annular retaining plate 54 by means of pins, said retaining plate being clamped between the housing and gear casing 2 and prevented from relative rotation by means of a radially extending locking projection 55 fitting into a recess provided therefor in the gear casing 2. In this way the stop disk may be said to be anchored to a fixed part of the housing. The latch disk 49 is provided near its periphery with a laterally projecting stud 56, which, as the latch disk is rotated by the tappet described above, engages with either stop shoulder 57 provided upon the stop disk 53 by enlarging the diameter thereof for half of its circular extent as indicated at 58 and clearly shown in Fig. 4. These shoulders, therefore, act as "stops" and further rotating of the elements is prevented, thus indicating the extreme limit of movement.

In the housing proper is shown a sleeve member 59, surrounding the tubular shaft 11, provided with an integral annular and radially extending flange 60, on each side of which are disposed rings 61 which are held in place by a spanner ring nut 62 screwed into the rear end of the housing 1. By these parts the tubular shaft is prevented from longitudinal movement relative to the housing and casing. Any suitable type of washer may be interposed between the rings 61.

For the purpose of withdrawing the work from the cutter when its cutting operation upon a piece of work is performed, and also for the purpose of moving up a new piece of work in proper relation to the cutter, provision is made whereby the device in general, including the housing 1, casing 2 and table 3, the slide-way plate 4 and standard 34 with attached elements, is traversed over the bed-plate 5, the latter being provided with the groove 6 in which may travel any suitable guide key 4″, secured in any appropriate manner to the slide-way plate, as may be readily understood in mechanisms embodying movements of the sort described. It is, of course, desirable, when a piece of work is moved into cutting engagement with the milling cutter, that it shall not be advanced too far, that is to say, that it shall advance to a position relative to the rotating cutter at which the initial cut shall be at the required depth for the threads, or, in other words, at the proper depth for obtaining the diameter of the thread preliminary to the piece of work being rotated about its own axis for further cutting of the thread therearound. For the purpose of accomplishing this result, there is provided in the groove 6 an abutment stop 64 which is capable of sliding adjustment in the groove and being fixed at any predetermined position by way of tightening the socket nut 65 upon the bolt 66, thereby drawing up the stop member in frictional engagement with the overhanging shoulders of the groove 6. The stop member 64 is provided at its end with an enlargement 67 against which the end of the guide key 4″ abuts as the mechanism in general is traversed relative to the base plate 5, as described above, and there is also provided upon this stop member an index element 68, the position of which as the stop member is adjusted and set in the groove, may be compared with the graduation marks provided upon the surface of the bed plate 5 adjacent the groove 6, in the initial determination of the abutting position of the device in its traverse. It is, therefore, obvious, that having set the stop at a predetermined position for the proper depth cut in a piece of work, that this stop will, for all successive pieces of work, of the same class, to be cut, limit the initial feed-in movement of the mechanism carrying the work to the cutter, at the same point, thereby maintaining a consistency in the depth of the threads cut in all the pieces of work of a class or lot. The stop may, therefore, be set at a new position whenever there is a change made from one type of work to another.

For the purpose of cutting the threads with a taper, the device in general is supported at one end thereof by means of a pedestal 7, the bottom surface of which may be flat, thereby permitting free movement thereof over the top surface of the table 3, and at the other end the device is supported in a universal joint means which in turn is supported upon a standard 34 fixed to the slide-way plate 4. The device is, therefore, pivoted upon the pivot pins 40 alined in a vertical axis and angular movement of the device is, therefore, horizontally permitted over said table about said vertical axis. The pedestal 7, as heretofore described, is provided with slotted ears 9, and the table 3 with set screws 10, by means of which the pedestal may be clamped to the table 3 at any angularly adjusted position. At the forward end of the pedestal is provided an index pointer 69 which rides over arcuately disposed graduation marks 70, by which the angle of taper may be indicated and determined.

It is, therefore, obvious that while the mechanism is located with its axis B—B at an angle to the main axis A—A, which angle is the angle of taper, yet the movement of the mechanism, and the piece of work carried thereby, imparted thereto by the master screw and nut means, is longitudinally parallel to the main axis A—A and not along the axis B—B (see Fig. 1). This movement is, of course, guided by the sliding of the table 3 over the dove tail keyway 4' on the slide-way plate 4, whose center lines is in the same vertical plane as axis A—A.

The cutter D is supported and actuated by any suitable means that may be placed upon the machine support upon which the mechanism forming the subject-matter of this disclosure is also supported. It is to be understood also that this cutter is adapted to be located at any desired position relative to the main axis A—A, depending upon the size and character of work to be operated upon, as for example, in the case of operating upon a piece of work for the purpose of cutting external threads, as shown in Fig. 1, or internal threads as shown in Fig. 5.

The operation of the device is performed as follows:

The cutter D having been set at the position desired and while rotating at its cutting speed, a piece of work is inserted in the expanding jaws of the collet or mandrel, whereupon the crank 24 is turned in a clockwise direction, the hub 24, by reason of its threaded engagement with the mandrel portion 18, causes a longitudinal movement of said mandrel or collet to the right as viewed in Fig. 2 of the drawing, whereby the jaws of the collet 15 are forced against the bushing 14, the tapered surfaces between the same compelling the jaws to move radially inwardly and securely clamping the work. The mechanism in general, as supported upon the slideway plate 4, is caused to traverse over the bed-plate 5 either manually or by any means suitable to perform this traversing function to a point when the work comes into contact with the rotating cutter and at the proper thread cutting depth engagement between the work and the cutter, at which point the guide key 4'', secured to the slide-way plate, contacts with the abutment end 67 of the stop 64, which stop may have been set in position as predetermined from the relation of the index with the graduation marks. It may, of course, be feasible to set the stop against the slide-way plate at the time of the engagement and the gaging of the thread depth chosen to be cut in the first piece of work inserted in the machine, after which the stop so fixed acts as the limit abutment for all successive traverses of the device for that class or lot of work.

The operator next manually rotates the ball crank 45, by which worm shaft 44, the worm 43 and worm gear 46 are caused to rotate. The relative positions of the worm gear 46, tapped disk 47, latch disk 49 and stop disk 53, at the start of each cycle of operation of the device, are as shown in Fig. 4. As the worm gear 46 is rotated a like movement is given tappet disk 47, the tappet stud 51 being carried away from the radial extension 52 on the latch disk 49 for nearly a complete circular course until said tappet stud 51 engages with the opposite side of the radial extension 52, at which instant the latch disk 49 is caused to rotate with the tappet disk 47 in its further rotation. At this instant, also, the laterally projecting stud 56, fixed to the latch disk 49, leaves one of the shoulders 57 (see base of Fig. 4), and after the latch disk is carried through substantially a semi-circular path, this stud 56 will engage the other shoulder 57 (at the upper part of Fig. 4) and further rotation of the parts is stopped at this point, since the shoulders are part of a means anchored, as heretofore stated, to a fixed part of the housing.

Inasmuch as the worm gear 46 is keyed to the tubular shaft 11, the latter is caused to rotate with the worm gear and also since the collet or mandrel means is frictionally locked with this tubular shaft through the bushing 14, the said collet or mandrel also rotates with the tubular shaft, and as the work is clamped in the collet, the same rotative movement is imparted thereto. It will thus be seen that the piece of work is given rotation about its own axis, as it is being cut, to the extent substantially of a circumference and a half. It is only necessary that the extent of rotation be at least a complete circular turn in order that initial and terminal cuts may fully meet. It has been found desirable in practice, however, to overrun the cuts and in the embodiment disclosed herein, I have given it an overrun of substantially one-half circumference.

As the tubular shaft 11 is rotated with the worm gear 46, its movement is also imparted to the universal joint elements and the master screw 38. The latter turns in the master nut 36, which is fixed in relative position to the standard 34 and slide-way plate 4 of the machine, and therefore, such turning of the master screw in the master nut causes a longitudinal progression of the device with its table 3, to the left, as shown in Fig. 2, over the slide-way plate 4, as the tubular shaft and attached elements are given their rotative movement. This gives a resultant movement of the surface of the work in the path of a helix, so that as the cutting operation progresses, the pitch of the thread is controlled thereby, the work having advanced, longitudinally, one thread for one complete revolution thereof, the initial cut of a thread meeting exactly with the terminal cut of the next adjacent thread at the end of the cutting operation. In this way the thread or helix is accurately produced, and this, only, or substantially so, in one turn of the work relative to the cutter, the cutter, of course, simultaneously cutting a plurality of grooves throughout the extent of the work operated upon.

At the end of the cutting function when the elements are stopped by the stud 56 contacting stop shoulder 57, the operator withdraws the mechanism as a whole, including the work, from the cutter by slidably moving or traversing the device across the bed-plate 5 and away from the stop 64. As soon as the work is cleared from the cutter, the operator rotates the crank 24 at the rear end of the mechanism, in a counter-clockwise direction turning the hub 24, mandrel 18, collet 15, tubular shaft 11, worm gear 46, worm 43, and the parts shown in Fig. 4, as well as the universal joint parts and master screw 38, backward a turn and a half, the frictional engagement between the collet 15 and bushing 14 being sufficient to maintain the parts together during such operation and the pitch of the worm, as heretofore stated, being relatively great, permitting the reverse rotation thereof by way of the gear 46. It will thus be seen that the stud 51 on the tappet disk 47 at its returning movement disengages the extension 52 on the latch disk 49 and travels through substantially a complete circumferential path until it reëngages said extension on the opposite side thereof, whereupon it carries the latch device 49 with its stud 56 for another half turn until the same are prevented from further rotation as the stud 56 engages one of the stop shoulders 57. Simultaneously with the reverse rotation of the parts mentioned above, the same movement is imparted by means of the rear extension of the tubular shaft 11, to the universal joint members and the master screw 38. The reverse rotation of this master screw 38 in the fixed master nut 36, therefore, longitudinally retracts the mechanism with its table 3 over the slide-way plate 4, to its initial position.

At this instant, since further rotation of the collet or mandrel means is prevented, a continued rotation of the crank 25 will cause relative movement between the hub 24 of this crank and the tubular part 18 of the mandrel or collet means, thereby driving the latter outwardly, or to the left, as viewed in Fig. 2, releasing the collet jaws from the bushing 14 and permitting them to expand and release the finished piece of work. This terminates a cycle of operation.

The principal feature of this device is, however, in the idea of cutting a tapered thread. This is accomplished by first moving the device in general with its pedestal 7 relatively over the table 3 and angularly about the vertical axis of the vertical pivot pins 40 of the universal joint to the angle of taper desired, the angle between the axes B—B and A—A indicating the same. The magnitude of this angle is determined and indicated by the position of the index pointer 69 as compared with the graduation marks 70 provided upon the top of the table 3, as shown in Fig. 1.

While I have herein illustrated and described with considerable particularity a preferred embodiment of my invention, I do not hereby desire or intend to limit myself specifically thereto as various changes and modifications may be made in the details and in the arrangement of the various parts, and the invention may be adapted for varying classes of work or arranged to be driven from a suitable source of power instead of by hand, as required, without departing from the spirit and scope of the invention as defined in the appended claims.

Having thus described my invention, I claim and desire to protect by Letters Patent of the United States:

1. In a thread milling mechanism having a rotating milling cutter, the combination of a housing, a support for said housing, means for holding a piece of work to be milled, means to impart to said work a longitudinal and rotative movement at a relatively slow speed, said longitudinal movement being parallel to the axis of said cutter, independent means for imparting to said work similar movements in reverse direction at a relatively great speed, and means for locating said housing and work at an angle to said support whereby the work is milled with a taper.

2. In a thread milling mechanism having a rotating milling cutter, the combination of a housing, means for slidably supporting said housing for relative linear movement, means carried by said housing operative to hold a piece of work, means operative to impart to said work-holding means a relatively slow movement of rotation in one direction during a given linear progression with regard to said supporting means in a line parallel to the axis of said cutter, means operative to impart to said holding means a relatively rapid movement of rotation in a reverse direction during a linear recession with regard to said supporting means in a line parallel to the axis of said cutter, means operative to angularly adjust the position of said housing and holding means relative to said supporting means whereby the work is milled with a taper, means operative to traverse said supporting means, housing and holding means in a direction substantially at right angles to the linear direction of progression and recession of said housing and holding means, whereby the work is placed into milling engagement, and adjustable means to limit the movement of said traversing means.

3. In a thread milling mechanism, the combination of a housing, means for slidably supporting said housing for relative linear movement, an expansible collet rotatably mounted in said housing and operative to hold a piece of work, a tubular shaft surrounding said expansible collet and carrying a master screw, a master nut in fixed operative position with said supporting means and in operative connection with said master screw, a universal joint connection between said tubular shaft and said master screw, means to angularly adjust said housing about an axis of said universal joint relative to said supporting means whereby the work is milled with a taper, operating means for imparting to said tubular shaft and said collet a relatively slow rotary motion in one direction and for simultaneously imparting a similar rotary motion to said universal joint connection and master screw whereby a relative slow linear movement is imparted to said housing, shaft, collet and work in one direction relative to said supporting means and means operative through said universal joint connection and master screw and said operating means to impart similar rotary and linear movements at a relatively greater speed in the opposite direction.

4. In a thread milling mechanism, the combination of a housing, means for slidably supporting said housing for relative linear movement, an expansible collet rotatably mounted in said housing and operative to hold a piece of work, a rotatable tubular shaft girding said expansible collet for rotation therewith and having a master screw in operative connection therewith, a master nut in operative connection with said master screw and in fixed operative position relative to said supporting means, a worm gear connected to said tubular shaft for operative rotation therewith, a worm operative to rotate said gear, means in connection with said worm gear and said housing for limiting the amount of rotation of said tubular shaft, collet and work, said master nut and screw simultaneously imparting a linear movement to said housing, shaft, collet and work as the latter are rotated by said worm and gear, means operative through said collet and shaft for rotating said shaft and the parts in connection therewith in reverse direction, said master nut and screw imparting a reverse linear movement of said housing, shaft, collet and work to the initial starting position thereof, said limiting means also limiting said reverse movements at the initial starting position and means for binding and loosening said collet respectively with and from said tubular shaft for operatively engaging and disengaging said work.

5. In a thread milling mechanism, the combination of a housing, a longitudinally movable support therefor, a transversely movable base for said support, a tubular shaft rotatably mounted in said housing, an expansible collet operative to hold a piece of work and longitudinally slidable in said tubular shaft for operative connection therewith and disconnection therefrom, a master screw connected to said shaft and operative to rotate therewith, a master nut in operative connection therewith and located in fixed relation with said base whereby rotation of said screw in said nut imparts a simultaneous longitudinal movement to said housing and support relative to said base, a worm and worm gear operative to rotate said shaft and collet, means connected to said gear and said housing for limiting the rotary movement of said shaft and collet and the longitudinal movement of said housing and support, means comprising a crank having a grooved hub and a flanged member secured to said shaft and engaging in said groove operative to move said collet longitudinally of said shaft and independently thereof for clamping and releasing said work, means for angularly adjusting said housing relative to said support for milling said work with a taper, means for transversely moving said base and adjustable means to limit said transverse movement.

6. In a thread milling mechanism having a rotating cutter, the combination of a housing, a longitudinally slidable support therefor, a transversely slidable base for said support, a tubular shaft rotatably mounted in said housing, an expansible collet having a tapered portion longitudinally movable in said shaft for operative connection therewith and disconnection therefrom, means to longitudinally move said collet relative to said shaft, a tapered bushing fixed to said shaft operative with the tapered portion of said collet during the relative longitudinal movement of said collet to contract and expand said collet, means to rotate said shaft and collet at a relatively slow speed, means including said first-mentioned means for imparting a reverse rotative movement to said shaft and collet at a relatively rapid speed, means operatively connected to said shaft and said base for imparting a simultaneous, slow, linear movement of progression and a rapid linear movement of recession to said housing and support in a line parallel to the axis of said cutter, and means for transversely sliding said support relative to said base and means to limit the amount of said movement.

7. In a thread milling mechanism, the combination of means for holding a piece of work to be milled, means for transversely moving said work to and from a milling cutter, means to limit said transverse movement, means operative to feed said work relative to said cutter at a relatively slow rate of speed and with a given simultaneous longitudinal progression in a line parallel to the axis of said cutter, said cutter revolving about a fixed axis, means operative to limit the movement of said feeding means, means comprising said feeding means operative to impart to said work a quick return movement in the opposite direction at a relatively greater rate of speed than that at which the work is fed to the cutter, means comprising said second-mentioned limiting means for limiting said return movement at the initial starting position, and means for initially adjusting said holding means whereby the work is milled with a taper.

8. In a thread milling mechanism, the combination of a housing, a support therefor, a work holding collet longitudinally movable with respect to said housing, a tubular shaft surrounding said collet, a master screw operatively connected to said shaft, a master nut located in fixed relation to said support and in operative engagement with said master screw, means operative to move said collet in respect to said shaft, means operative to rotate said collet and said shaft at a relatively slow speed, said first-mentioned means also operative to rotate said collet and said shaft at a relatively great speed, means operatively connected to said shaft and housing to limit the amount of said rotations and means for adjustably positioning said work relative to the milling cutter.

9. In a thread milling mechanism, the combination of a work holding collet, of a tubular shaft surrounding said collet, a crank provided with a threaded hub, means connected to said collet and in threaded engagement with said threaded hub operative to impart longitudinal movement to said collet with respect to said shaft when said crank is rotated, tapered means between said shaft and collet operative to bind said shaft and collet together by the rotation of said crank in one direction, independent means operative to rotate said shaft and collet together in one direction at a relatively slow speed, said crank operative to rotate said shaft and collet in reverse direction at a relatively great speed, means for limiting the rotation of said shaft and collet in said first direction, means comprising of the last-mentioned means for limiting the reverse rotation of said shaft and collet, said crank operative upon further reverse rotation to cause relative movement between said hub and collet whereby said collet is moved longitudinally of said shaft for disengagement therefrom.

10. In a thread milling mechanism, the combination of a housing, a support therefor, a work holding collet longitudinally movable relative to said housing and provided with expanding jaws at one end and a threaded portion at the other end, a crank provided with a threaded hub operatively engaging said threaded end portion, a tubular shaft rotatably mounted in said housing and surrounding said collet, one end of said shaft operative to engage said expanding jaws and the other end of said shaft operative to engage said hub whereby relative longitudinal movement between said shaft and hub is prevented, said crank and hub operative to longitudinally move and engage said collet with said shaft when rotated in one direction, means to rotate said shaft and collet, lead means connected with said shaft and said support operative upon the rotation of said shaft to impart simultaneous longitudinal movement to said housing, shaft and collet relative to said support, said crank operative, when rotated in reverse direction to rotate said shaft and collet in reverse direction and also to impart simultaneous reverse longitudinal movement of said housing, shaft and collet, means including a limit stop for limiting said reverse movement, said crank and hub operative upon further reverse rotation to impart to said collet a reverse longitudinal movement relative to said shaft whereby said jaws are disengaged from said shaft, and means for limiting said further reverse rotation of said crank.

11. In a thread milling mechanism, the combination of a housing, a gear casing secured thereto, a slidable table supporting said housing and casing, a slide-way plate slidably supporting said table, a rotatable tubular shaft mounted in said housing and casing, an expansible work-holding collet slidably mounted in said shaft, means operatively connected to said collet for imparting relative longitudinal movement between said shaft and collet in one direction, said movement operative to bind said collet to said shaft and to clamp said work, a master screw operatively connected to said shaft, a standard rigidly secured to said slide-way plate, a removable master nut in fixed operative relation to said standard and operatively engaging said master screw, a worm gear in said casing surrounding said shaft and secured thereto for rotation therewith, a worm in said casing operative to rotate said gear, said shaft and said collet in one direction at a relatively slow speed, said master nut and screw operative upon the rotation of said shaft to simultaneously impart a longitudinal movement in one direction to said housing, said casing, said table, said shaft and said collet at a predetermined relatively slow speed, means including said first-mentioned means operative to rotate said shaft and said collet in reverse direction at a relatively rapid speed, said master nut and screw operative upon reverse rotation of said shaft to simultaneously impart longitudinal movement in a reverse direction to said housing, said casing, said table, said shaft and said collet at a relatively rapid speed, means operatively connected to said worm gear and to said casing including a plurality of limit stops, one of said stops operating to limit the rotation of said shaft in one direction and another of said stops to limit the rotation of said shaft in the reverse direction, said first-mentioned means operative upon further reverse rotation to impart to said collet a longitudinal movement relative to said shaft in a reverse direction, said movement operative to disengage said collet from said shaft and to release said work, and a limit stop provided in said first-mentioned means operative to limit the last-mentioned longitudinal movement of said collet.

12. In a thread milling mechanism, the combination of a housing, a table for supporting the same, a slide-way plate for slidably supporting said table, a base for slidably supporting said slide-way plate for movement in a transverse direction, a rotatable tubular shaft operatively mounted in said housing, an expansible work holding collet operatively mounted in said shaft, a master nut supported in fixed operative relation with said base, a master screw operative in said nut and provided with diametrically alined pivots for pivotally connecting said master screw to said shaft for rotation therewith, means to cause relative longitudinal movement of said collet and shaft, means to cause the simultaneous rotation of said shaft, said collet and said master screw relative to said master nut, and the simultaneous longitudinal movement of said housing, said shaft, said collet and said table relative to said slide-way plate, means for adjustably moving said housing, said shaft and said collet relative to said table and angularly about said pivots whereby a taper is given the work milled, means for securing said last-mentioned means to said table in adjusted position, means for guiding and limiting the transverse movement of said slide-way plate relative to said base, whereby the work is moved to the milling cutter to a predetermined cutting engagement.

13. In a thread milling mechanism, the combination of a housing, means mounted in said housing for holding a piece of work to be milled, means for moving said work with a predetermined pitch past a cutter revolving about a fixed axis, means for limiting the extent of said movement, said last-mentioned means including a series of relatively movable members, said members provided with spaced and mutually engageable elements whereby after a predetermined amount of movement said elements engage with each other for moving said members together, one of said members anchored to said housing and another of said members connected to and movable with said second-mentioned means, said anchored member acting as an abutment stop for the movement of said other members and said second-mentioned means.

14. In a milling mechanism, means to hold a piece of work to be milled, means operative to produce relative movement between the work and a revolving cutter, means for limiting the movement of said second-mentioned means, said means including a series of adjacently located movable members and a stationary member, one of said movable members operatively connected to said second-mentioned means for movement therewith, mutually engageable means on said members operative after a predetermined relative movement of adjacent members to engage and cause said members to move together, said stationary member provided with a stop, said engageable means also operative to engage said stop.

15. In a milling mechanism, means for rotatably holding a piece of work to be milled, means to position said work at an angle to a rotating cutter for milling the work with a taper, means operative to produce a combined relative rotary and linear movement between said work and cutter, said means including a universal joint connected to said work holding means, a master screw connected to said universal joint and a stationary master nut operatively connected to said master screw.

In witness whereof I have hereunto set my hand this 3rd day of December, A. D. 1918.

PETER P-G. HALL.